United States Patent

Baena

[11] Patent Number: 5,944,217
[45] Date of Patent: Aug. 31, 1999

[54] PRESSURE TANK

[75] Inventor: Richard Baena, Le Port Marly, France

[73] Assignee: Olaer Industries, Colombes, France

[21] Appl. No.: 09/019,455

[22] Filed: Feb. 5, 1998

[30] Foreign Application Priority Data

Feb. 6, 1997 [FR] France ................................. 97 01341

[51] Int. Cl.⁶ ............................................... B05D 25/16
[52] U.S. Cl. .......................................... 220/723; 220/551
[58] Field of Search ...................... 220/723, 551

[56] References Cited

U.S. PATENT DOCUMENTS

| | | | |
|---|---|---|---|
| 3,534,884 | 10/1970 | Sutgu .................................... | 220/723 |
| 3,730,307 | 5/1973 | Mitchell ................................ | 220/723 |
| 4,817,830 | 4/1989 | Yavorsky .............................. | 220/723 |
| 5,176,178 | 1/1993 | Schurter et al. ...................... | 220/723 |
| 5,190,184 | 3/1993 | Lechner ................................ | 220/723 |
| 5,636,760 | 6/1997 | Yamamoto et al. ................... | 220/723 |

FOREIGN PATENT DOCUMENTS 36 32 988   6/1988   Germany.

*Primary Examiner*—Joseph M. Moy
*Attorney, Agent, or Firm*—Weingarten, Schurgin, Ganebin & Hayes LLP

[57] ABSTRACT

The invention concerns a pressure tank comprising a rigid casing having opposite first and second orifices, and an elastically deformable separator extending inside the casing between the two orifices and subdividing the inside volume of the casing into variable-volume first and second compartments. The second compartment communicates with a hydraulic circuit via the second orifice. The first compartment is filled with elastically deformable solid elements, and the resulting assembly behaves like a spring. In the non-compressed state, the overall volume of the elastically deformable solid elements is substantially equal to the volume of the first compartment when the separator is at rest.

10 Claims, 1 Drawing Sheet

PRESSURE TANK

FIELD OF THE INVENTION

The invention relates to pressure tanks of the type used, for example, as pressure accumulators or as pulsation dampers in a hydraulic circuit.

It relates more precisely to a pressure tank comprising a rigid casing having opposite first and second orifices, and an elastically deformable separator extending inside the casing between the two orifices and subdividing the inside volume of the casing into variable-volume first and second compartments, the second compartment being designed to communicate with a liquid circuit via the second orifice.

In currently used pressure tanks, the first compartment is filled with a gas under pressure fed in via the first orifice, which orifice is then closed off in gastight manner.

The separator may be constituted by a bladder made of a flexible material, the aperture in the bladder surrounding the first orifice. The separator may also be constituted by a substantially hemispherical flexible membrane whose aperture is fixed to the largest diameter of the casing.

When the separator is at rest, i.e. when the pressure of the liquid is substantially zero, the volume of the first compartment is substantially equal to or slightly less than the inside volume of the casing.

The purpose of the separator is firstly to establish a pressure balance between the first compartment and the second compartment. An increase in the pressure of the liquid causes an increase in the pressure of the gas, and therefore a decrease in the volume of the first compartment by means of the membrane deforming elastically.

The separator must therefore provide fluid-tightness between the two compartments, and, to this end, must be as impermeable as possible to gas.

This condition is not satisfied or is satisfied only very incompletely, in particular in the following two cases: when the pressure tank is used under high temperature conditions, or with certain liquids.

It is well known that the permeability to gas of elastomers increases with increasing temperature, in particular at temperatures above 90° C. This means that, when the pressure tank is used under high temperature conditions, firstly its effectiveness is reduced, and secondly gas losses are diluted in the liquid, which can cause the system with which said tank is associated to malfunction or stop. Furthermore, at high temperatures, the risk of separator rupture increases rapidly, the gas contained in the pressure tank then being released instantaneously into the system with damaging consequences. By way of example, it is recalled that in certain applications, such as in power stations or in feed circuits for marine diesel engines using heavy fuel oils, the fuel oil must be pre-heated to a temperature in the range 120° C. to 150° C.

Moreover, certain liquids having an unstable state are vaporous (e.g. liquid ammonia, liquid $CO_2$), and the gas given off by such liquids migrates, via the separator, into the first compartment, and inflates it to the extent that the pressure tank is rendered almost inoperative.

OBJECTS AND SUMMARY OF THE INVENTION

An object of the invention is to eliminate the problems inherent to using a gas as the compressible agent.

The invention achieves this object by the facts that, in the pressure tank proposed, the first compartment is filled with elastically deformable solid elements, the resulting assembly behaving like a spring, and that, in the non-compressed state, and with the separator being at rest, the overall volume of the elastically deformable solid elements is substantially equal to the volume of the first compartment.

With this configuration, the reduction in the volume of the first compartment is limited by the incompressible volume of the material of the elements. The pressure tank proposed makes it possible to withstand pressure peaks that are considerably higher than those that can be accommodated with gas apparatus, without damaging the separator.

The volume left empty by the material of the elastically deformable solid elements is occupied by a gas at atmospheric pressure.

To make it easier for the elastically deformable solid elements to move relative to and against one another, a lubricating liquid compatible with the material of the separator and with the material of the elements is provided in the first compartment. For example, the lubricating liquid may be glycol, glycerin, silicone oil, or a mineral oil. The volume of the lubricating liquid is smaller than that of the interstices left empty by the solid elements in the non-compressed state. For example, the volume of lubricating liquid may be less than 10% of the volume left empty by the elastically deformable solid elements when the separator is at rest. The lubricating liquid makes it possible for the solid elements to be organized more uniformly when they are under compression, thereby offering a more uniform bearing surface against which the separator can press, the separator then working more uniformly and being less strained.

Advantageously, each of the elastically deformable solid elements is cylindrical and hollow in shape, and is made of silicone, e.g. by cutting up tubes commonly used in chemistry or biology test set-ups. The length of each of the elements is greater than its outside diameter. The outside diameter of each of said elements lies in the range 2.5 mm to 4 mm, its inside diameter lies in the range 1 mm to 2 mm and its length lies in the range 3 mm to 8 mm. When a lubricating liquid is provided, it should be noted that, in operation, the hollow insides of the solid elements in the non-compressed state retain a fraction of the lubricating liquid because of its surface tension, this fraction thus being kept in reserve for lubricating the solid elements during the following compression regardless of the position of the tank.

BRIEF DESCRIPTION OF THE DRAWING

Other advantages and characteristics of the invention appear on reading the following description given by way of example and with reference to the accompanying drawing, in which.

MORE DETAILED DESCRIPTION

Figure 1:
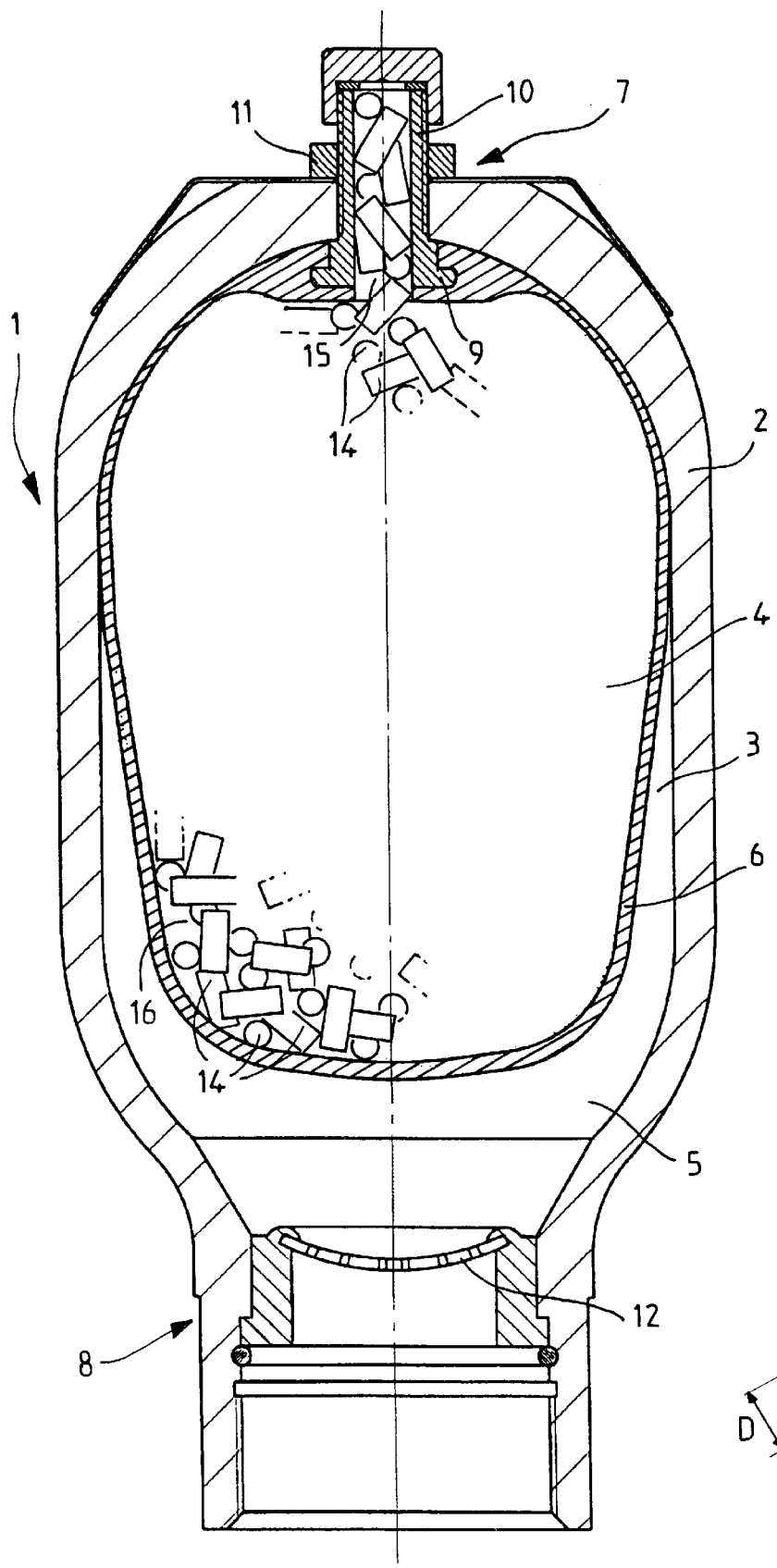
FIG. 1 is a section view of a pressure tank of the invention as equipped with a bladder.

FIG. 1 shows a pressure tank 1 which, in a manner known per se, comprises a rigid outer casing 2 whose internal cavity 3 is separated by means of an elastically deformable separator 6 into two compartments 4 and 5, namely a first compartment 4 that can communicate with the outside of the casing 2 via a first orifice 7 provided through the top of the casing 2, and a second compartment 5 that can communicate with a pressurized-liquid hydraulic circuit via a second orifice 8 provided through the bottom of the casing 2.

In the embodiment shown in FIG. 1, the casing 2 is elongate, and it has a substantially cylindrical middle portion and two substantially hemispherical ends, and it is made in one piece, e.g. by forming. The separator 6 is in the form of a bladder whose mouth 9 is equipped with a hollow end-piece 10 mounted in fluid-tight manner in the first orifice 7, e.g. by means of a nut 11, the hollow end-piece 10 being provided with a bore 15 and with a stopper cap 17 making it possible to isolate the inside volume of the first compartment 4 from the outside.

The essential function of the stopper cap 17 is to retain the elastically deformable elements in the inside volume of the first compartment 4. It may optionally provide gastightness depending, in particular, on the environment in which the pressure tank is used. It can be noted, by way of example, that when the pressure of the liquid is raised to 50 bars, most of the energy is absorbed by the elasticity of the elastically deformable solid elements, and the increase in the pressure of the interstitial gas is about 1 bar. For most commonly-used elastomers, since the gas losses through permeability are proportional to the ΔP, such a ΔP in practice leads to an absence of gas losses. In a very aggressive environment, it is thus possible to provide gastightness at the stopper cap 17, or, in a less polluting environment, it is possible to provide flats on the thread on the end-piece 10 on which the stopper cap 17 is screwed, thereby enabling the compartment 4 to breathe.

The second orifice 8 is equipped with a strainer 12 or with a filter, and optionally with a control valve (not shown in the drawing).

The bladder is made of a synthetic material, e.g. of the elastomer type, it has a certain amount of resilience, and it is sufficiently fluid-tight.

At rest, i.e. when the liquid pressure in the second compartment 5 is low, the bladder 6 occupies nearly the entire volume of the internal cavity 3.

According to the invention, the first compartment 4 is filled with elastically deformable solid elements 14 instead of being filled with a gas as is usually the case.

Figure 2:
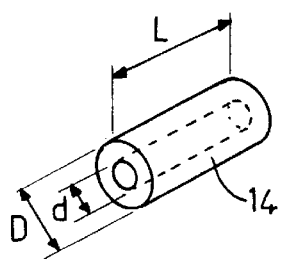
FIG. 2 is a perspective view of an elastically deformable solid element.

As shown in FIG. 2, the elastically deformable elements 14 are substantially cylindrical in shape and hollow. The length L of each element is longer than its outside diameter D, and its inside diameter d is substantially equal to one half of its outside diameter D. Preferably, the outside diameter D of each of the elements 14 lies approximately in the range 2.5 mm to 4 mm, its inside diameter d lies approximately in the range 1 mm to 2 mm, and its length L lies approximately in the range 3 mm to 8 mm.

The elements 14 are preferably made of silicone and, in practice, they may be produced by cutting up silicone tubes commonly used in chemistry or biology test set-ups.

The overall volume of the elements 14 in the non-compressed state contained in the first compartment 4 is substantially equal to the volume of the bladder 6 in the rest state. The elements 14 also fill the volume of the bore 15 through the end-piece 10. The elements 14 are inserted into the first compartment 4 via the bore 15, the diameter of the bore being chosen accordingly.

In order to make it easier for the elements 14 to move relative to and against one another, a lubricating liquid 16 compatible with the materials of the bladder 6 and of the elements 14 is provided in the first compartment 4. For example, the lubricating liquid 16 may be glycol, glycerin, a silicone oil, or a mineral oil depending on the materials of the elements 14 and of the bladder.

To enable the volume of the first compartment to vary under the action of the pressure of the liquid contained in the second compartment 5, the volume of the lubricating liquid 16 is considerably smaller than the volume of the interstices left empty by the elements 14 in the non-compressed state. In practice, the volume of the lubricating liquid is smaller than 10% of the volume not occupied by the material of the elements 14.

The volume of the bladder 6 at rest that is not occupied by the material of the elements 14 or by the lubricating liquid is filled with a suitable gas, e.g. nitrogen, at atmospheric pressure when the compartment 4 is isolated from the outside, or, otherwise, it is filled naturally with atmospheric air.

The resulting assembly operates as a spring. Increases in the pressure of the liquid in the hydraulic circuit are conveyed to the liquid of the second compartment 5 via the second orifice 8, thereby compressing the bladder 6. This compression reduces the volume of the first compartment 4. As a result, the elements 14 undergo elastic deformation, and the interstitial gas undergoes negligible compression, with the lubricating liquid contained in the first compartment 4 being distributed.

Most of the compression energy is stored up by the elastically deformable elements 14 which act as springs.

The reduction in the volume of the first compartment 4 is limited by the incompressible volume of the material of the elements 14, and optionally of the lubricating liquid. The minimum volume of the first compartment 4 is substantially equal to one half of the bladder 6 at rest. The pressure tank 1 of the invention makes it possible to withstand pressure peaks that are much higher than those that can be accommodated with conventional gas apparatus, without damaging the bladder or more generally the separator because, under maximum compression conditions, it lies against the surface formed by the set of elements 14.

The pressure tank of the invention has a lower compressibility ratio (about 1 or 2) than that of common gas apparatus. This lower compressibility ratio may be compensated by dimensioning the tank appropriately.

By appropriately choosing the parameters D, d, and L of the elements 14, and the coefficient of elasticity of the material of said elements, it is possible to adjust the compressibility curve of the tank.

In addition to being capable of withstanding higher pressure peaks, the tank of the invention offers the advantages of being easy to store, of being usable without being pre-filled with a gas under pressure, of requiring no maintenance (re-filling with gas), and of eliminating the possibility of physically or chemically contaminating the hydraulic circuit with which the tank is associated, even if the bladder 6 ruptures, in which case the strainer 12 shown prevents the elements 14 from going into the hydraulic circuit. If a valve is used instead of the strainer, it is necessary merely to insert a filter between the valve and the associated circuit, the sole function of the filter being to retain the elements 14 before they reach said circuit.

In addition, the material of the elements 14 is chosen such that the elements 14 cannot dissolve in the liquid of the hydraulic circuit. To this end, it should be noted that silicone is not spoiled in mineral oil.

In addition, the elements 14 may be made of any solid material having suitable resilient characteristics, such as certain elastomers.

In the above-described embodiment, the pressure tank 1 contains a bladder 1. The invention is also applicable to a spherical tank including a substantially hemispherical separator determining two variable-volume chambers.

I claim:

1. A pressure tank comprising a rigid casing having opposite first and second orifices, and an elastically deformable separator extending inside the casing between the two orifices and subdividing the inside volume of the casing into variable-volume first and second compartments, the second compartment being designed to communicate with a liquid circuit via the second orifice;

wherein the first compartment is filled with elastically deformable solid elements, the resulting assembly behaving like a spring, and wherein, in the non-compressed state, and with the separator being at rest, the overall volume of the elastically deformable solid elements is substantially equal to the volume of the first compartment.

2. A pressure tank according to claim 1, wherein, in the non-compressed state, with the separator being at rest, the volume left empty by the material of the elastically deformable solid elements is occupied by a gas at atmospheric pressure.

3. A pressure tank according to claim 1, wherein the first compartment further contains a lubricating liquid compatible with the material of the separator and with the material of the elements so as to make it easier for the elastically deformable solid elements to move relative to and against one another, the volume of the lubricating liquid being smaller than that of the interstices left empty by the solid elements in the non-compressed state.

4. A pressure tank according to claim 3, wherein the volume of lubricating liquid is less than 10% of the volume left empty by the material of the elastically deformable solid elements.

5. A pressure tank according to claim 1, wherein each of the elastically deformable solid elements is substantially cylindrical and hollow in shape.

6. A pressure tank according to claim 5, wherein the length of each of said elements is greater than its outside diameter.

7. A pressure tank according to claim 6, wherein the outside diameter of each of said elements lies in the range 2.5 mm to 4 mm.

8. A pressure tank according to claim 6, wherein the length of each of said elements lies in the range 3 mm to 8 mm.

9. A pressure tank according to claim 6, wherein the inside diameter of each of said elements lies in the range 1 mm to 2 mm.

10. A pressure tank according to claim 5, wherein the elastically deformable solid elements are made of silicone.

* * * * *